Aug. 16, 1927.
R. V. L. HARTLEY
1,638,993
MODULATION SYSTEM
Filed April 22, 1925
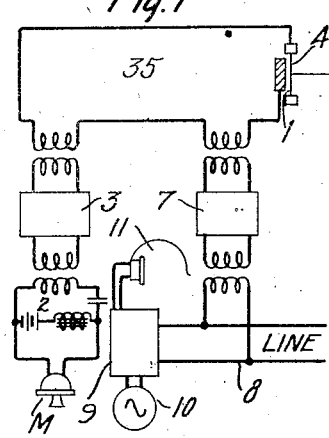
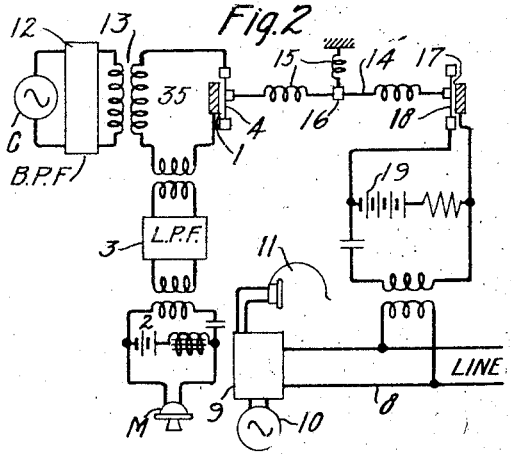
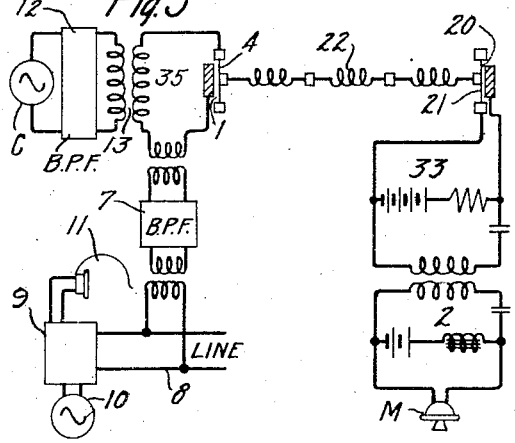
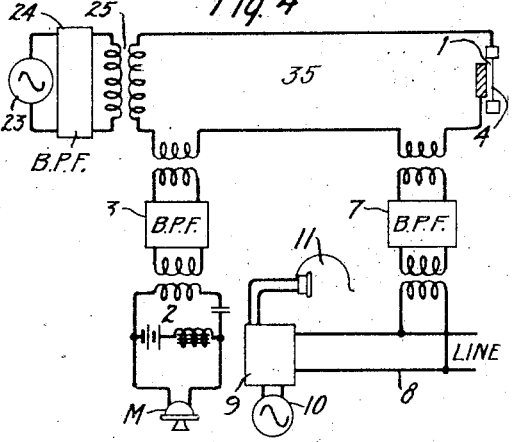
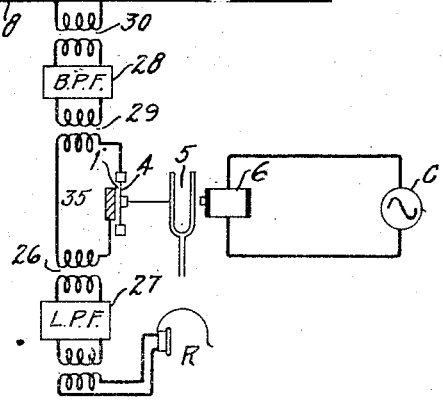
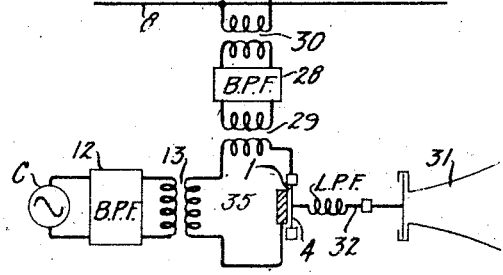
Inventor:
Ralph V.L. Hartley
by ~~~~ Atty.

Patented Aug. 16, 1927.

1,638,993

UNITED STATES PATENT OFFICE.

RALPH V. L. HARTLEY, OF SOUTH ORANGE, NEW JERSEY, ASSIGNOR, BY MESNE ASSIGNMENTS, TO WESTERN ELECTRIC COMPANY, INCORPORATED, A CORPORATION OF NEW YORK.

MODULATION SYSTEM.

Application filed April 22, 1925. Serial No. 24,941.

This invention relates to signal transmission systems and more particularly to an electromechanical modulating system wherein a movable element is used to transform electrical oscillations into mechanical vibrations, or to transform mechanical vibrations into electrical oscillations.

An object of this invention is to provide a modulating system capable of operating without space discharge modulating devices. Another object is to provide a signaling system in which one or more of the component frequencies occur as mechanical vibrations.

These objects and others, which will be apparent as the nature of the invention is disclosed, are accomplished in a carrier signaling system in which a carrier frequency is modulated by speech frequency to produce sum and difference frequencies, commonly called side bands, by means of a movable plate condenser used to transform electrical oscillations into mechanical vibrations or vice versa. Electrical charges impressed upon the condenser produce mechanical forces upon the plates which cause the movable plate to vibrate, or charges on the plate and mechanical motion thereof produce variations in the voltage across the plates which tend to cause variable currents to flow in an associated electric circuit.

The operation of a system of this kind may be more readily understood by considering that the force F acting upon a condenser plate is proportional to the square of the electrical charge ($Q^2$) upon the plate. Assuming that electrical currents at signal frequency and carrier frequency are applied to the condenser, then charge Q will be equal to the sum of the charges produced by the two currents that is equal to $Q_v + Q_c$. Squaring ($Q_v + Q_c$) to find the force F which is proportional to $Q^2$ we obtain the following equation:

$$KF = Q_v^2 + Q_c^2 + 2Q_vQ_c$$

The first two terms are proportional to the squares of the charges at the applied frequencies and the third term is proportional to the product of the charges applied at the two frequencies.

As the instantaneous values of $Q_v$ and $Q_c$ are equal to $q_v \cos \omega_v t$ and $q_c \cos \omega_c t$ respectively, expanding trigonometrically we obtain for $Q^2_v$ and $Q^2_c$ terms involving cos $2\omega_v t$ and cos $2\omega_c t$ and for $Q_v \times Q_c$ we obtain terms involving cos ($\omega_c + \omega_v$) and cos ($\omega_c - \omega_v$). The first two terms correspond to forces applied at frequecies of twice the applied frequencies and the third term corresponds to forces applied at the sum and difference frequencies or to side band frequencies. By suppressing vibrations of the double frequencies the resulting motion corresponds to side band frequencies only, that is if charges at carrier and speech frequencies are applied to the vibrating condenser plate, the resultant motion thereof will correspond to sideband frequencies only.

In case one component is applied electrically and one mechanically the resulting force will appear as an electro-motive force of side band frequency in the associated circuit. The resulting voltage V is proportional to the charge Q times the displacement or distance between plates, D, that is, for the case where the signal is applied electrically and the carrier is applied mechanically, $$KV = q_v \cos \omega_v t \times D_c \cos \omega_c t$$

expanding, we get a term involving cos ($\omega_c + \omega_v$)$t$ and cos ($\omega_c - \omega_v$)$t$ that is the voltage varies at sideband frequencies.

Although the novel features which are believed to be characteristic of this invention will be pointed out more particularly in the claims appended hereto, the invention itself, its objects and advantages, the manner of its operation and the mode of its organization will be better understood by referring to the following description taken in connection with the accompanying drawings forming a part thereof in which;

Fig. 1 is a diagrammatic representation of an electro-mechanical modulating system in which signals of voice frequency are applied electrically and forces of carrier frequency are applied mechanically to produce electrical side bands.

Fig. 2 is a system of the above character in which forces of carrier frequency and voice frequency are applied electrically and the resulting side bands occur as mechanical vibrations.

Fig. 3 is a system in which the carrier is applied electrically and voice frequency signals mechanically to produce electrical side bands.

Fig. 4 shows a modulating system in which carrier and voice frequency oscillations are applied electrically to produce electrical side bands.

Fig. 5 shows a detection system in which side bands are applied electrically and the local carrier is applied mechanically to produce electrical currents of signal frequency; and Fig. 6 is a detection system in which electrical side bands are combined with an electrically supplied carrier to produce mechanical vibrations of signal frequency.

In the system shown in Fig. 1 an electrical charge varying at voice frequency is applied electrically to vibrating plate condenser 1 electrically from microphone M operating with the usual microphone circuit 2 through low pass filter 3 which is designed to suppress frequencies other than those of the applied signal. The condenser 1 is included in the circuit 35. A force of carrier frequency is applied to vibrating diaphragm 4 of condenser 1 mechanically by means of tuning fork 5 which is rigidly connected thereto and actuated by electromagnet 6 in response to waves from source C which is adapted to produce oscillations of carrier frequency. The resulting electrical side bands are passed through band pass filter 7 and impressed upon output circuit 8 which may be a transmission line or a radiating system. The transmitted side bands are detected at the remote cooperating station in a detector corresponding to the detector 9 to which oscillations of carrier frequency are locally supplied from a source corresponding to source 10 and made available in a signal responsive device corresponding to device 11, herein shown as a telephone receiver. The incoming side bands are similarly detected and employed to produce signaling indications as a result of the operation of devices 9, 10 and 11. The devices 9, 10 and 11 may be of the same type and cooperate in the same manner as the corresponding elements illustrated in Fig. 5, which will be described later.

The voltage across condenser 1 is proportional to the product of the charge applied at signal frequency and the displacement which varies at carrier frequency. The charge is applied electrically to the plates of the condenser from microphone circuit 2 and the displacement of carrier frequency is produced by the vibrations of tuning fork 5. From the preceding explanation it will be seen that these two factors will produce electromotive forces corresponding to side band frequencies which will produce currents in the circuit in which is included the condenser depending upon the impedance of the circuit for these frequencies. These currents of side band frequencies are passed through filter 7 and impressed upon line 8 from which they are removed and detected as desired.

Although the system as above described operates as a carrier suppression system, it may be converted into a carrier transmission system by the addition of a direct current source in the circuit including condenser 1. The electromotive force on the condenser plate would then be proportional to the product of the direct current charge and the displacement of carrier frequency. As one of these components is a constant, the resulting electromotive force would produce carrier frequency currents which would be passed through filter 7 and impressed upon the line.

Although the particular means of introducing vibrations mechanically has been shown as a tuning fork any other suitable means of introducing vibrations of the desired frequency may be employed, such as a mechanical vibrator operating with or without a mechanical filter.

In the system shown in Fig. 2, currents of voice frequency are applied in the same manner as shown in Fig. 1 through correspondingly designated elements. Charges of carrier frequency are applied to condenser 1 electrically from source C through filter 12, designed to pass a relatively small band of frequencies including the carrier frequency, and transformer 13. The resulting forces of side-band frequency produce vibrations which are removed mechanically through band pass mechanical filter 14 composed of suitably arranged springs 15 and masses 16. These mechanical vibrations of side-band frequency are converted into electric currents of corresponding frequencies in any suitable manner, the means herein shown being a second vibrating plate condenser 17 having movable diaphragm 18 to which the mechanical vibrations are applied from diaphragm 4 through mechanical filter 14. The vibrations of diaphragm 18 to which an electrical charge is applied from source 19, are converted without change of frequency into electrical energy and impressed upon line 8 as electrical side bands.

In the system shown in Fig. 3 a charge of carrier frequency is applied to condenser 1 electrically from source C through band pass filter 12 in a manner similar to that described in connection with the previous figure. The forces of signal frequency are applied to diaphragm 4 as mechanical vibrations from microphone M, and associated circuit 2, as previously described, by impressing charges corresponding to the variations in resistance of microphone M upon the condenser 20 which, in combination with the polarizing voltage from source 33, cause movable diaphragm 21 to vibrate in accordance with signals applied to the microphone. Mechanical vibrations are transferrred to diaphragm 4 from diaphragm 21 through low pass mechanical filter 22. Although this particular system has been shown for applying mechanical vibrations of voice frequency to diaphragm 4 any other suitable system might be employed such as a telephone transmission circuit in which a receiver diaphragm is actuated by variations in resistance of an associated microphone circuit. The resulting electrical side bands are removed in the manner described in connection with Fig. 1 through correspondingly numbered elements.

In the system shown in Fig. 4, signals of voice frequency are applied and the resulting electrical side bands removed in the manner described in connection with Fig. 1. Displacements of carrier frequency are secured in diaphragm 4 by driving it electrically, instead of mechanically as in Fig. 1. Source 23, operating at one-half carrier frequency supplies through band pass filter 24 and transformer 25 a charge varying at one-half the carrier frequency rate which produces a force on condenser 1 of the carrier frequency, due to the force being proportional to the square of the charge as previously explained. By making the diaphragm resonant at carrier frequency vibrations at that frequency only will result.

In the system shown in Fig. 5 electrical side bands from line 8 are applied to condenser 1 through band pass filter 28 and transformers 29 and 30 which will produce a charge on plate 4 varying at side band frequencies. Displacement varying at carrier frequency is produced by tuning fork 5 in a manner similar to that described in connection with Fig. 1. As the resulting electromotive force upon condenser 1 will occur at the sum and difference frequencies of the applied components, the condenser will operate as a demodulator and produce a resultant electromotive force at the original signal frequency which is passed through transformer 26 and low pass filter 27 to operate a signal responsive device R.

In the system shown in Fig. 6 electrical currents of side band frequency, received from line 8, are impressed upon condenser 1 in a manner similar to that described in connection with Fig. 5. Charges varying at carrier frequency are applied electrically through band pass filter 12 and transformer 13. The resulting forces in condenser 1 set up mechanical vibrations of signal frequency which are removed mechanically and actuate any suitable signal responsive means such as a diaphragm 31. A mechanical filter 32 may be employed to transmit vibrations from diaphragm 4 to diaphragm 31 if desired.

In the operation of the systems described above modulation and demodulation are accomplished mechanically by means of a vibrating plate without the use of space discharge devices. The mechanical and electrical impedances should be equal to secure maximum energy transfer between the respective portions of the circuit. The electrical and mechanical impedance of the circuit 35 as a whole should be high for undesired frequencies and, as the various branches are connected in series, the impedance of the branch circuits, as viewed from the circuit 35 for frequencies which they do not transmit should be low compared with that of the branch circuits which do transmit these frequencies. For example the impedance of circuit 3 (Fig. 1) as viewed from circuit 35 is high for speech frequencies and low for carrier wave and side frequencies and the impedance of circuit 7 as viewed from circuit 35 should be high for side band frequencies and low for speech and carrier frequencies. The term "wave" is used in the specification and claims to designate either the mechanical or electrical variations of the system.

Although this invention has been shown and described as applied to particular systems in a particular manner, it is not to be limited thereto but only in accordance with the scope of the invention as defined by the following claims.

What is claimed is:

1. A modulating system comprising a source of waves of signal frequency, a source of waves of carrier frequency, a condenser having a movable and a stationary plate, means for impressing an electric charge corresponding to said wave of signal frequency upon said condenser, means for causing said movable plate to vibrate in accordance with said waves of carrier frequency whereby a charge is produced on said condenser varying at side band frequencies, and means for utilizing said charge of side band frequencies comprising an electric circuit and a band pass filter adapted to pass said frequencies.

2. A modulating system comprising a source of waves of signal frequency, a source of waves of carrier frequency, a condenser having a movable and a stationary plate, means for impressing an electric charge corresponding to said wave of signal frequency upon said condenser, means for causing said movable plate to vibrate in accordance with said waves of carrier frequency whereby a charge is produced on said condenser varying at side band frequencies, and means for utilizing said charge of side band frequencies comprising an electric circuit and a band pass filter adapted to pass said frequencies in combination with means for producing currents of signal frequency comprising a source of local oscillations of carrier frequency and a detector for combining said carrier frequency oscillations with said side bands.

3. In a modulating system, a source of variations of carrier frequency, a source of variations of signal frequency, a modulating device comprising a condenser having a rigid plate and a vibrating plate for combining said variations to produce a signal modulated wave and means for converting said signal modulated wave into sound waves, the electrical and mechanical impedance of said system being high for variations of undesired frequencies.

4. In a modulating system, a source of variations of carrier frequency, a source of variations of signal frequency, a modulating device comprising a condenser having a rigid plate and a vibrating plate for combining said variations to produce a signal modulated wave, and channels connecting said sources with said modulating device, said channels each being of low impedance for variations of desired frequencies other than the frequency transmitted therethrough.

5. In a modulating system, a source of variations of carrier frequency, a source of variations of signal frequency, a modulating device comprising a condenser having a rigid plate and a vibrating plate for combining said variations to produce a signal modulated wave and channels connecting said sources with said modulating device, said channels each being of low impedance for variations of desired frequencies other than the frequency transmitted therethrough the electrical and mechanical impedance of said systems as a whole being high for variations of undesired frequencies.

6. An electrical system comprising a movable plate condenser, means for electrically charging said condenser in accordance with waves of one frequency and means for physically operating said plate by mechanical means operating at another frequency, said electrical charges and said mechanical operations being combined in said condenser to produce a signal modulated wave 7. A system for the production of waves of one frequency by the conjoint action of waves of two other frequencies comprising a movable plate condenser in which said frequencies are combined and means for effecting the intertransfer of wave energy from a source to said condenser in the form of mechanical vibrations comprising a mechanically vibratory system connected to said movable plate and free to vibrate at one of said three frequencies.

8. A system in accordance with claim 7, characterized by the provision of mechanically selective means connected to said movable plate for transferring the vibratory waves of one of said frequencies to the exclusion of vibratory waves of at least one of said other frequencies.

In witness whereof, I hereunto subscribe my name this 20th day of April A. D., 1925.

RALPH V. L. HARTLEY